US009024673B1

United States Patent
Venkata et al.

(10) Patent No.: US 9,024,673 B1
(45) Date of Patent: May 5, 2015

(54) TECHNIQUES FOR PROVIDING CLOCK SIGNALS IN AN INTEGRATED CIRCUIT

(71) Applicant: Altera Corporation, San Jose, CA (US)

(72) Inventors: Ramanand Venkata, Fremont, CA (US); Ryan Fung, Mississauga, CA (US); Ketan H. Zaveri, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/075,869

(22) Filed: Nov. 8, 2013

(51) Int. Cl.
*G06F 1/04* (2006.01)
*G06F 1/10* (2006.01)

(52) U.S. Cl.
CPC ........................................ *G06F 1/10* (2013.01)

(58) Field of Classification Search
USPC .......................... 327/291, 295–297, 546–565
See application file for complete search history.

(56) References Cited

U.S. PATENT DOCUMENTS

| 6,107,826 | A | 8/2000 | Young et al. |
| 6,426,649 | B1 | 7/2002 | Fu et al. |
| 6,862,548 | B1 | 3/2005 | Chan |
| 6,975,154 | B1 | 12/2005 | Pedersen |
| 7,126,406 | B2 * | 10/2006 | Vadi et al. ..................... 327/293 |
| 7,145,362 | B1 | 12/2006 | Bergendahl et al. |
| 7,228,451 | B1 | 6/2007 | Nguyen et al. |
| 7,737,751 | B1 | 6/2010 | Lai et al. |
| 8,581,653 | B1 | 11/2013 | Maruri et al. |

* cited by examiner

*Primary Examiner* — An Luu
(74) *Attorney, Agent, or Firm* — Steven J. Cahill (57) ABSTRACT

An integrated circuit includes a first vertical clock bus and a first interface circuit coupled to provide first global clock signals to the first vertical clock bus. The first interface circuit is coupled to a first external terminal of the integrated circuit. The integrated circuit also includes a second vertical clock bus and a second interface circuit coupled to provide second global clock signals to the second vertical clock bus. The second interface circuit is coupled to a second external terminal of the integrated circuit. A third horizontal clock bus is coupled to provide the first and the second global clock signals from the first and the second vertical clock buses to a center region of the integrated circuit.

20 Claims, 9 Drawing Sheets

TECHNIQUES FOR PROVIDING CLOCK SIGNALS IN AN INTEGRATED CIRCUIT

FIELD OF THE DISCLOSURE

The present disclosure relates to electronic circuits, and more particularly, to techniques for providing clock signals in an integrated circuit.

BACKGROUND

Clock networks, which are also referred to as clock trees, are used to distribute clock signals in integrated circuits. More particularly, in conventional clock networks, input clock signals are received through dedicated clock input pads. Clock signals are then distributed to regions of the integrated circuit through clock networks having conductors and buffers. Clock networks typically include multiple layers of buffers that improve clock signal integrity.

BRIEF SUMMARY

According to some embodiments, an integrated circuit includes a first vertical clock bus and a first interface circuit coupled to provide first global clock signals to the first vertical clock bus. The first interface circuit is coupled to a first external terminal of the integrated circuit. The integrated circuit also includes a second vertical clock bus and a second interface circuit coupled to provide second global clock signals to the second vertical clock bus. The second interface circuit is coupled to a second external terminal of the integrated circuit. A third horizontal clock bus is coupled to provide the first and the second global clock signals from the first and the second vertical clock buses to a center region of the integrated circuit.

Various objects, features, and advantages of the present invention will become apparent upon consideration of the following detailed description and the accompanying drawings.

DETAILED DESCRIPTION

According to some embodiments disclosed herein, an integrated circuit includes a global clock network that has global clock buses. Each of the global clock buses has one or more clock lines that include conductors and buffer circuits. Some of the global clock buses extend from near a first edge of the integrated circuit to near a second edge of the integrated circuit that is parallel to the first edge.

In some embodiments, the integrated circuit includes vertical global clock buses that are distributed across the integrated circuit and horizontal global clock buses that are perpendicular to the vertical global clock buses. Global clock signals generated in or received at interface circuits in the integrated circuit can be provided through the vertical global clock buses and the horizontal global clock buses to the center region of the integrated circuit. The global clock signals are then provided from the center region of the integrated circuit through a global clock spine, secondary clock spines, and tertiary clock spines to destination circuits located throughout a core region of the integrated circuit.

Regional and local clock signals can be provided from the interface circuits directly to the secondary clock spines. The regional and local clock signals can be provided to destination circuits in the integrated circuit through the secondary and tertiary clock spines without routing through the global clock buses or through the global clock spine. Peripheral clock signals can be provided from the interface circuits directly to the tertiary clock spines. The peripheral clock signals can be provided to destination circuits in the integrated circuit through the tertiary clock spines without routing through the global clock buses, the global clock spine, or the secondary clock spines.

Figure 1:
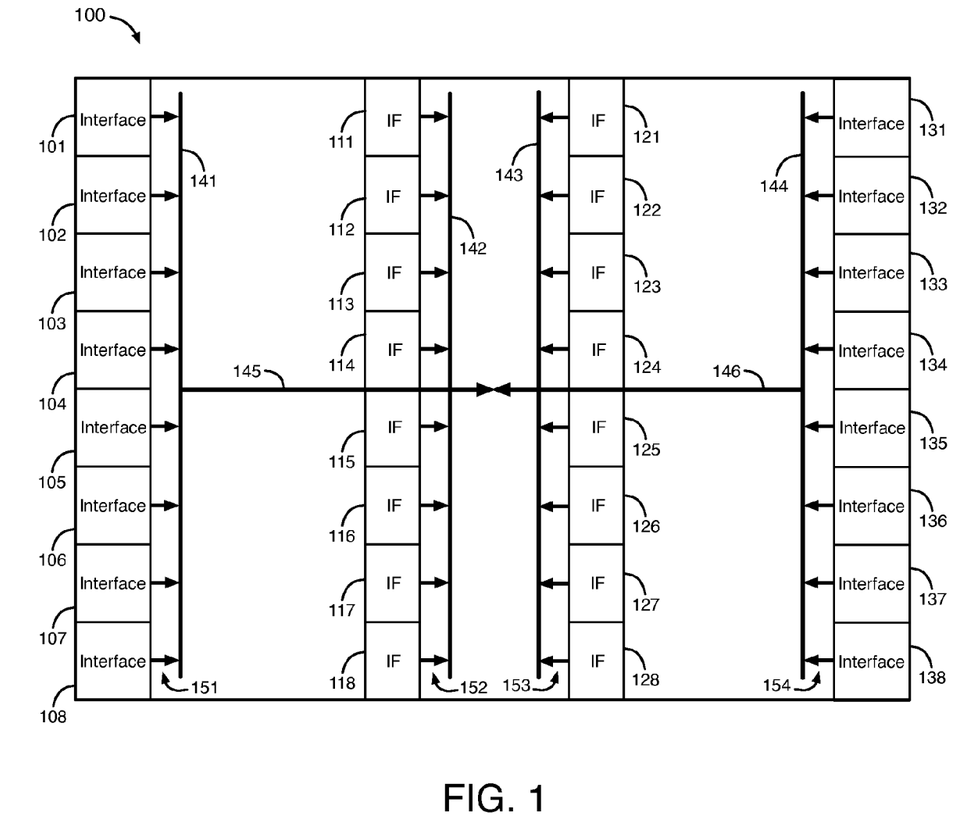
FIG. 1 illustrates an example of an integrated circuit having a global clock network that includes global clock buses, according to an embodiment of the present invention.

FIG. 1 illustrates an example of an integrated circuit 100 having a global clock network that includes global clock buses, according to an embodiment of the present invention. Integrated circuit 100 shown in FIG. 1 includes four columns of interface circuits, four vertical global clock buses 141-144, two horizontal global clock buses 145-146, and four sets of horizontal conductors 151-154. Clock buses 141-146 and conductors 151-154 are part of the global clock network of integrated circuit 100. The global clock network of integrated circuit 100 can be configured to provide global clock signals to destination circuits in a core region of the integrated circuit. The global clock network of integrated circuit 100 may, for example, be configured to provide global clock signals to destination circuits in each of four quadrants of the core region.

A clock bus includes one or more parallel clock lines for conducting one or more clock signals. Each clock line has at least one conductor. Each clock line may, for example, include multiple conductors that are coupled together by buffer circuits and/or multiplexer circuits.

The four global clock buses 141-144 are parallel to each other. Global clock buses 141-144 extend from near the top edge of integrated circuit 100 to near the bottom edge of integrated circuit 100. The bottom edge of integrated circuit 100 is parallel to the top edge. The length of each of the global clock buses 141-144 is more than half a width of integrated circuit 100.

Horizontal global clock bus 145 is coupled to vertical global clock buses 141-142. Horizontal global clock bus 146 is coupled to vertical global clock buses 143-144. Horizontal global clock bus 145 is perpendicular to vertical global clock buses 141-142. Horizontal global clock bus 146 is perpendicular to vertical global clock buses 143-144.

The first, second, third, and fourth columns of interface circuits include interface (IF) circuits 101-108, 111-118, 121-128, and 131-138, respectively. Thirty-two interface circuits are shown in FIG. 1 merely as an example. According to various embodiments, integrated circuit 100 may have any number of interface circuits (e.g., hundreds or thousands) that are coupled to provide global clock signals to the global clock network.

Integrated circuit 100 may be any type of integrated circuit, such as a programmable logic integrated circuit or an application specific integrated circuit. Each of the interface circuits 101-108, 111-118, 121-128, and 131-138 is coupled to one or more pads of the integrated circuit. The pads are external terminals of integrated circuit 100, such as conductive areas on a surface of the integrated circuit die. Interface circuits 101-108, 111-118, 121-128, and 131-138 can transmit and receive signals between external devices through the pads.

One or more of interface circuits 101-108, 111-118, 121-128, and 131-138 may be high-speed serial interface circuits (HSSI) that transmit serial data signals to and receive serial data signals from external devices. One or more of interface circuits 101-108, 111-118, 121-128, and 131-138 may be memory interface circuits that transmit data signals to and receive data signals from external memory devices (e.g., at a double-data rate). In an exemplary embodiment, interface circuits 101-108 and 131-138 are HSSI interfaces, and interface circuits 111-118 and 121-128 are memory interfaces.

In another embodiment, one or more of the interface circuits 101-108, 111-118, 121-128, and 131-138 are intellectual property (IP) circuit blocks. Intellectual property circuit blocks are programmable circuits that are programmed by a user of integrated circuit 100 (e.g., using software generated configuration bits) to perform predefined functions. In this embodiment, interface circuits 101-108, 111-118, 121-128, and 131-138 may, for example, be programmed to perform the functions of phase-locked loop circuits, processor circuits, memory interface controller circuits, and/or serializer/deserializer circuits.

Interface circuits 101-108, 111-118, 121-128, and 131-138 may include transmitter circuits, receiver circuits, and/or transceiver circuits. The transmitter, receiver, and/or transceiver circuits may include clock signal generation circuits, such as phase-locked loop (PLL) circuits, delay-locked loop (DLL) circuits, counter circuits, or clock data recovery (CDR) circuits. The clock signal generation circuits in the interface circuits may generate output clock signals in response to clock signals received from external devices through the pads.

Horizontal conductors 151-154 are coupled to vertical global clock buses 141-144, respectively. First global clock signals are provided from interface circuits 101-108 through horizontal conductors 151 to vertical global clock bus 141. Second global clock signals are provided from interface circuits 111-118 through horizontal conductors 152 to vertical global clock bus 142. Third global clock signals are provided from interface circuits 121-128 through horizontal conductors 153 to vertical global clock bus 143. Fourth global clock signals are provided from interface circuits 131-138 through horizontal conductors 154 to vertical global clock bus 144. The interface circuits may, for example, generate the first, second, third, and fourth global clock signals using PLL, DLL, counter, or CDR circuits.

The first global clock signals are provided from vertical global clock bus 141 to horizontal global clock bus 145. The second global clock signals are provided from vertical global clock bus 142 to horizontal global clock bus 145. The first and the second global clock signals are provided through horizontal global clock bus 145 to the center region of the integrated circuit 100.

The third global clock signals are provided from vertical global clock bus 143 to horizontal global clock bus 146. The fourth global clock signals are provided from vertical global clock bus 144 to horizontal global clock bus 146. The third and the fourth global clock signals are provided through horizontal global clock bus 146 to the center region of the integrated circuit 100. The first, second, third, and fourth global clock signals are provided from the center region of the integrated circuit 100 to destination circuits in integrated circuit 100 through additional portions of the global clock network, as shown in and described below with respect to FIGS. 4-7.

Figure 2:
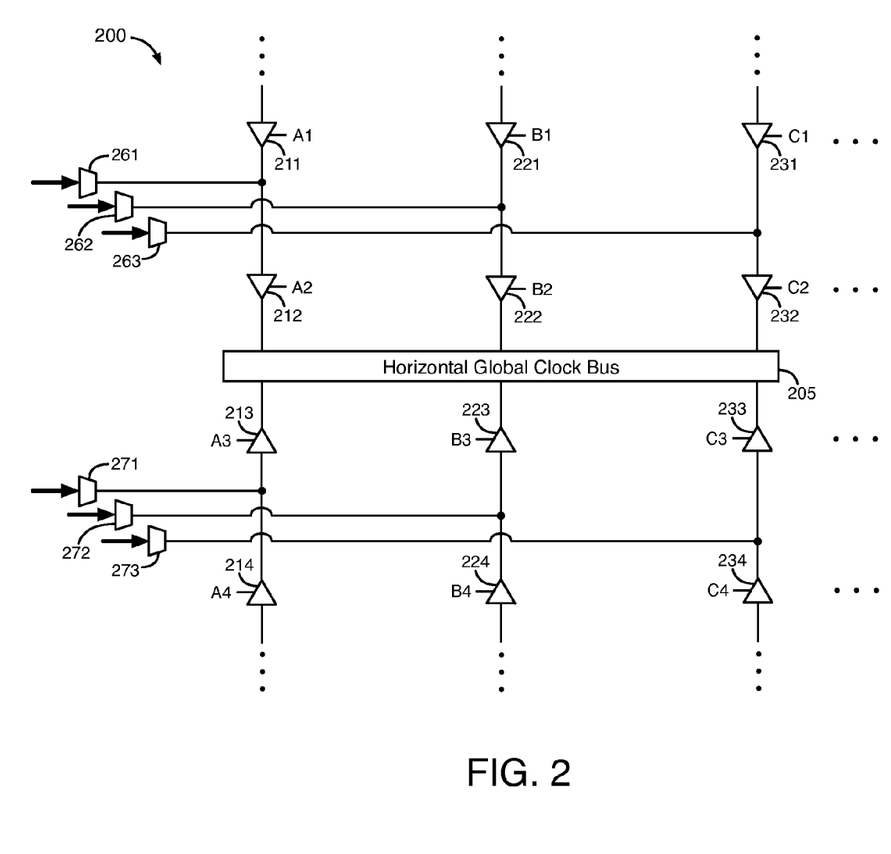
FIG. 2 illustrates an example of a vertical global clock bus, according to an embodiment of the present invention.

Each of the four vertical global clock buses 141-144 shown in FIG. 1 includes one or more clock lines. FIG. 2 illustrates an example of a vertical global clock bus 200, according to an embodiment of the present invention. Vertical global clock bus 200 is an example of each of the vertical global clock buses 141-144 shown in FIG. 1.

In the example of FIG. 2, vertical global clock bus 200 includes six or more clock lines. The first, second, and third clock lines include buffer circuits 211-212, 221-222, and 231-232, respectively. The fourth, fifth, and sixth clock lines include buffer circuits 213-214, 223-224, and 233-234, respectively. Each of the clock lines also includes vertical conductors. The vertical conductors in the clock lines are shown as vertical lines in FIG. 2 that couple together the buffer circuits and the horizontal global clock bus 205. Each of the clock lines may include additional buffer circuits and vertical conductors not shown in FIG. 2. In an embodiment, the conductors that transmit clock signals in the clock buses described herein are wide metal lines that are shielded from noise. Horizontal global clock bus 205 is one of horizontal global clock buses 145-146 shown in FIG. 1. Only a portion of horizontal global clock bus 205 is shown in FIG. 2 to simplify the drawing.

FIG. 2 also illustrates multiplexer circuits 261-263 and 271-273. Multiplexer circuits 261-263 and 271-273 receive clock signals at their multiplexing inputs from two of the interface circuits shown in FIG. 1 through respective subsets of horizontal conductors 151-154. Multiplexer circuits 261-263 and 271-273 are configured by select signals (not shown).

Each of the multiplexer circuits 261-263 may be configured to select a clock signal generated by a first interface circuit. The clock signals selected by multiplexer circuits 261-263 are provided to the first, second, and third clock lines, respectively, through horizontal conductors shown as horizontal lines in FIG. 2. Each of the multiplexer circuits 271-273 may be configured to select a clock signal generated by a second interface circuit. The clock signals selected by multiplexer circuits 271-273 are provided to the fourth, fifth, and sixth clock lines, respectively, through horizontal conductors shown as horizontal lines in FIG. 2. The first and second interface circuits may be interface circuits from any of the four columns of interface circuits shown in FIG. 1.

Buffer circuits 211-214, 221-224, and 231-234 are enabled and disabled by enable signals A1-A4, B1-B4, and C1-C4, respectively. Each of the first, second, third, fourth, fifth, and sixth clock lines is configurable to provide a clock signal to horizontal global clock bus 205 by enabling the corresponding buffer circuits. For example, buffer circuit 212 is enabled and buffer circuit 211 is disabled to provide the clock signal selected by multiplexer circuit 261 to horizontal global clock bus 205. As another example, buffer circuit 213 is enabled and buffer circuit 214 is disabled to provide the clock signal selected by multiplexer circuit 271 to horizontal global clock bus 205.

In an embodiment, integrated circuit 100 is coupled to an external circuit using a flip-chip configuration. In this embodiment, integrated circuit 100 has pads on the upper surface of the die. Solder bumps are deposited on the pads during wafer processing. Integrated circuit 100 is then flipped over so that its upper surface faces down and aligned so that its pads align with matching pads on an external circuit. The solder bumps are then flowed to complete the connection to the external circuit.

Figure 3A:
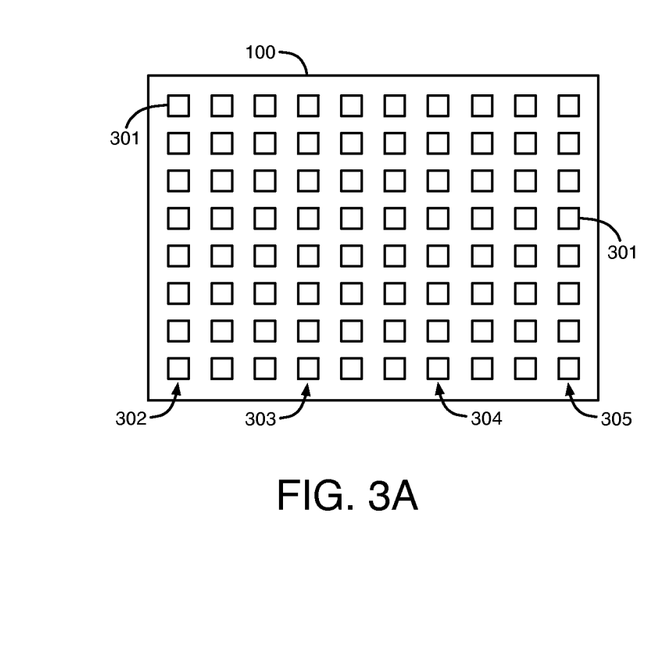
FIG. 3A illustrates an example of an integrated circuit having several pads that are distributed across the upper surface of the integrated circuit, according to an embodiment of the present invention.

FIG. 3A illustrates an example of integrated circuit 100 having several pads that are distributed across the upper surface of integrated circuit 100, according to an embodiment of the present invention. In the embodiment of FIG. 3A, integrated circuit 100 includes eighty pads 301. Eighty pads 301 are shown in FIG. 3A merely as an example and are not intended to be limiting. Pads 301 are external terminals of integrated circuit 100. Specifically, pads 301 are square-shaped conductive areas that are deposited on the upper surface of the die of integrated circuit 100 in the example of FIG. 3A.

FIG. 3A illustrates ten columns of pads including columns 302-305. Some of the pads 301 are coupled to interface circuits in integrated circuit 100. In the example of FIG. 3A, the pads 301 in column 302 are coupled to interface circuits 101-108. The pads 301 in column 303 are coupled to interface circuits 111-118. The pads 301 in column 304 are coupled to interface circuits 121-128. The pads 301 in column 305 are coupled to interface circuits 131-138. The other pads 301 may, for example, route supply and ground voltages.

Figure 3B:
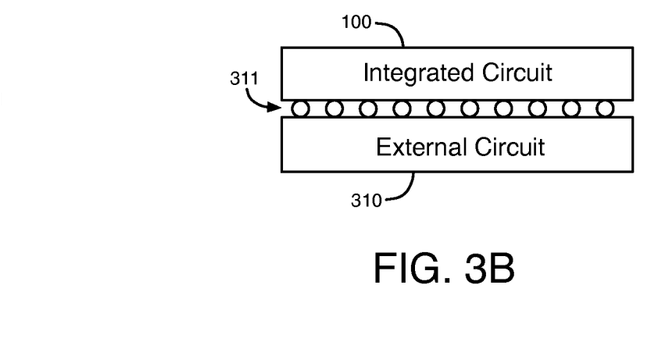
FIG. 3B illustrates an example of an integrated circuit mounted in a flip-chip configuration, according to an embodiment of the present invention.

FIG. 3B illustrates an example of integrated circuit 100 mounted in a flip-chip configuration, according to an embodiment of the present invention. Solder bumps 311 are coupled to the pads 301 of integrated circuit 100. Solder bumps 311 are also coupled to matching pads on an external circuit 310. External circuit 310 may be, for example, a circuit board or another integrated circuit. Signals and supply voltages may be transmitted to and from integrated circuit 100 through pads 301, solder bumps 311, and external circuit 310.

Figure 4:
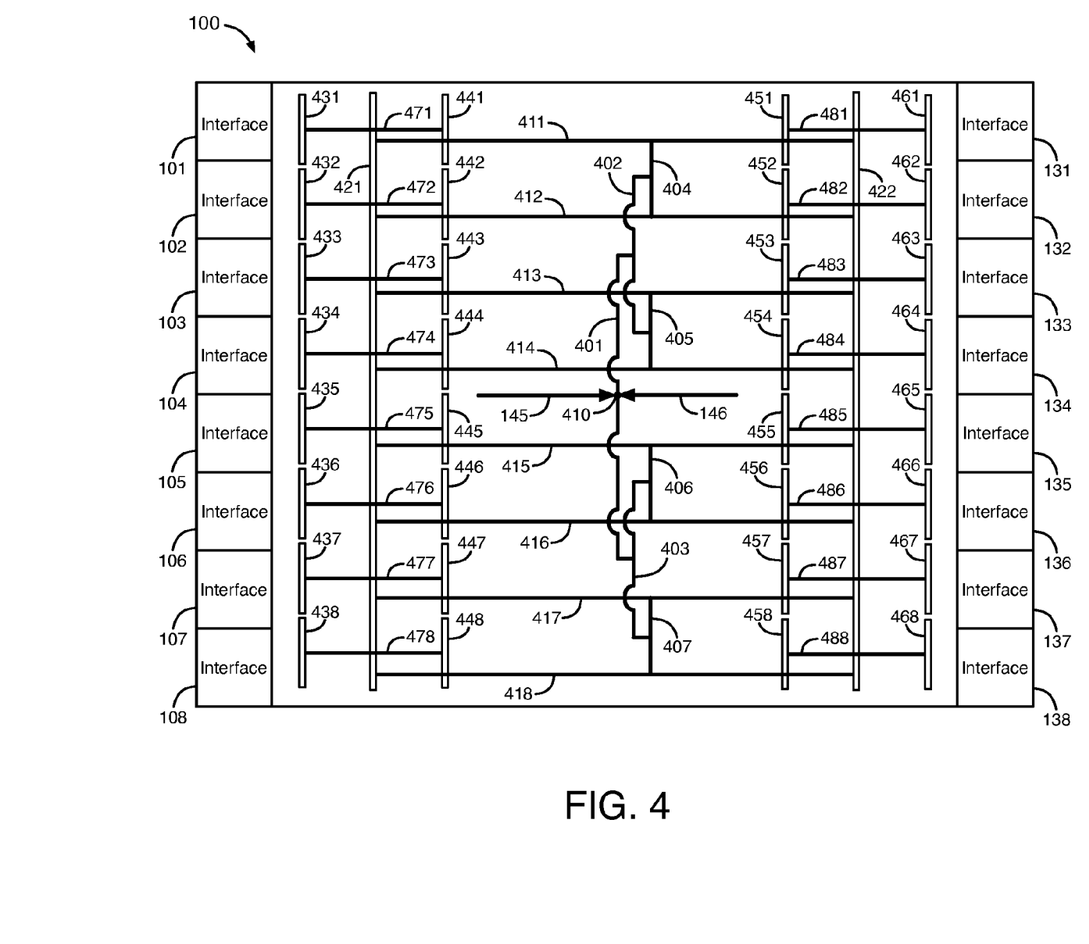
FIG. 4 illustrates additional portions of the global clock network in the integrated circuit of FIG. 1, according to an embodiment of the present invention.

FIG. 4 illustrates additional portions of the global clock network in integrated circuit 100, according to an embodiment of the present invention. FIG. 4 shows interface circuits 101-108 and 131-138. Interface circuits 111-118 and 121-128 are not shown in FIG. 4 to simplify the drawing. FIG. 4 also illustrates portions of horizontal global clock buses 145-146. FIG. 4 further illustrates a global clock spine that includes clock buses 401-407. FIG. 4 further illustrates horizontal clock buses 411-418, secondary clock spines 421-422, horizontal clock buses 471-478 and 481-488, and tertiary clock spines 431-438, 441-448, 451-458, and 461-468. Clock buses 401-407, horizontal clock buses 411-418, secondary clock spines 421-422, horizontal clock buses 471-478 and 481-488, and tertiary clock spines 431-438, 441-448, 451-458, and 461-468 are part of the global clock network of integrated circuit 100.

As described above with respect to FIG. 1, the first, second, third, and fourth global clock signals are provided to the center region of integrated circuit 100 through horizontal global clock buses 145-146. The first, second, third, and fourth global clock signals are provided from horizontal global clock buses 145-146 to clock bus 401 through connections 410. Connections 410 may, e.g., include buffer and/or multiplexer circuits. Each of the 7 clock buses 401-407 has twice as many clock lines as each of the horizontal global clock buses 145 and 146. As an example, if each of the horizontal global clock buses 145-146 has 16 clock lines that each transmit a different clock signal, then each of clock buses 401-407 has 32 clock lines that can transmit 32 different clock signals. Each of the seven clock buses 401-407 has the same number of clock lines for transmitting the same number of global clock signals.

The global clock spine provides the first, second, third, and fourth global clock signals to the top half of integrated circuit 100. Clock bus 401 provides the first, second, third, and fourth global clock signals to clock bus 402. Clock bus 402 provides the global clock signals received from clock bus 401 to clock buses 404-405. Clock bus 404 provides the global clock signals received from clock bus 402 to horizontal clock buses 411-412. Clock bus 405 provides the global clock signals received from clock bus 402 to horizontal clock buses 413-414.

The global clock spine also provides the first, second, third, and fourth global clock signals to the bottom half of integrated circuit 100. Clock bus 401 also provides the first, second, third, and fourth global clock signals to clock bus 403. Clock bus 403 provides the global clock signals received from clock bus 401 to clock buses 406-407. Clock bus 406 provides the global clock signals received from clock bus 403 to horizontal clock buses 415-416. Clock bus 407 provides the global clock signals received from clock bus 403 to horizontal clock buses 417-418. The global clock signals may, for example, be provided from one clock bus to another clock bus through buffer circuits, multiplexer circuits, and/or conductors.

Horizontal clock buses 411-418 provide the global clock signals received from clock buses 404-407 to secondary clock spines 421-422. The global clock signals in horizontal clock buses 411-418 are provided to horizontal clock buses 471-478 in the left half of integrated circuit 100 from horizontal clock buses 411-418, respectively, through secondary clock spine 421. The global clock signals in horizontal clock buses 411-418 are also provided to horizontal clock buses 481-488 in the right half of integrated circuit 100 from horizontal clock buses 411-418, respectively, through secondary clock spine 422. The global clock signals in horizontal clock buses 471-478 are provided to tertiary clock spines 431-438 and to tertiary clock spines 441-448, respectively, in the left half of integrated circuit 100. The global clock signals in horizontal clock buses 481-488 are provided to tertiary clock spines 451-458 and to tertiary clock spines 461-468, respectively, in the right half of integrated circuit 100. The global clock signals are then provided from the tertiary clock spines to destination circuits, as shown in and described herein with respect to FIGS. 5-6.

The global clock network of integrated circuit 100 provides equal delays to the global clock signals that are received from interface circuits in corresponding locations in the right and left halves of integrated circuit 100. For example, global clock signals that are provided from interface circuit 102 to a destination circuit have the same delay through the global clock network as global clock signals that are provided from interface circuit 132 to the destination circuit. As another example, the global clock network provides the same delay to global clock signals received from interface circuit 116 as the global clock network provides to global clock signals received from interface circuit 126.

Figure 5:
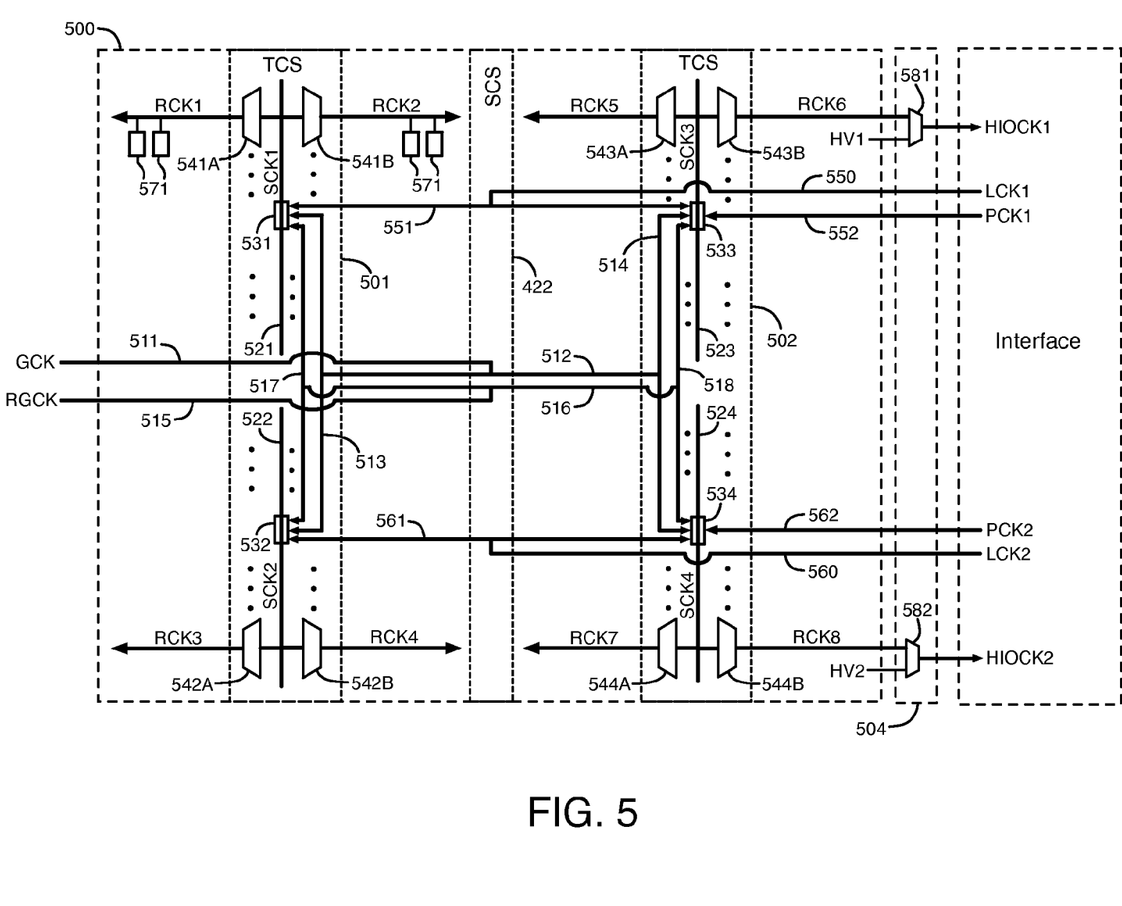
FIG. 5 illustrates a region of the integrated circuit of FIG. 1 that includes two tertiary clock spines and a portion of a secondary clock spine of the global clock network, according to an embodiment of the present invention.

FIG. 5 illustrates a region 500 of integrated circuit 100 that includes two tertiary clock spines (TCS) 501-502 and a portion of secondary clock spine (SCS) 422 of the global clock network, according to an embodiment of the present invention. Region 500 is an example of a region of integrated circuit 100 that includes two tertiary clock spines 501-502, a portion of secondary clock spine 422, and an interface circuit 505. Tertiary clock spines 501 and 502 and interface circuit 505 are examples of tertiary clock spines 451-458, tertiary clock spines 461-468, and interface circuits 131-138, respectively. For example, tertiary clock spines 501 and 502 and interface circuit 505 are examples of tertiary clock spines 451 and 461 and interface circuit 131, respectively.

Horizontal clock bus 511 in FIG. 5 is an example of a respective one of the horizontal clock buses 411-418 shown in FIG. 4. Tertiary clock spine 501 includes multiplexer circuits 531-532 and 541-542 and clock buses 521-522, 513, and 517. Tertiary clock spine 502 includes multiplexer circuits 533-534 and 543-544 and clock buses 514, 518, and 523-524. Each of the multiplexer circuits shown or described herein is configured based on one or more select signals (not shown). Secondary clock spine 422 includes connections between clock buses 511, 515, 550, 560 and clock buses 512, 516, 551, 561, respectively.

The global clock signals provided through the global clock spine shown in FIG. 4 to the horizontal clock bus 511 are referred to as global clock signals GCK. The global clock signals GCK are provided through horizontal clock bus 511 to horizontal clock bus 512. Horizontal clock bus 512 is an example of a respective one of the horizontal clock buses 481-488.

The global clock signals GCK are provided through horizontal clock bus 512 to clock bus 513 in tertiary clock spine 501 and to clock bus 514 in tertiary clock spine 502. The global clock signals GCK are provided through clock bus 513 to first multiplexing inputs of each of multiplexer circuits 531 and 532. The global clock signals GCK are also provided through clock bus 514 to first multiplexing inputs of each of multiplexer circuits 533 and 534.

Multiplexer circuits 531-534 are configurable to generate clock signals SCK1, SCK2, SCK3, and SCK4, respectively, at their outputs based on the global clock signals GCK at their first multiplexing inputs. Clock signals SCK1, SCK2, SCK3, and SCK4 are provided from the outputs of multiplexer circuits 531-534 to vertical clock buses 521-524, respectively. Vertical clock buses 521-524 are coupled to multiplexer circuits 541-544, respectively. Vertical clock buses 521-524 provide clock signals SCK1, SCK2, SCK3, and SCK4 to multiplexer circuits 541-544, respectively.

Integrated circuit 100 includes numerous destination circuits that are distributed throughout its core region. Region 500 includes several destination circuits 571 arranged in rows. For example, region 500 may include thousands of destination circuits 571. Only four destination circuits 571 are shown in FIG. 5 to simplify the drawing. Destination circuits 571 may be any types of circuits. As an example that is not intended to be limiting, destination circuits 571 may be programmable logic circuits that include register circuits. The destination circuits 571 may be, for example, programmable logic array blocks (LABs).

Each row of destination circuits 571 is coupled to the output of one of multiplexer circuits 541-544 through a horizontal clock bus. Each of the multiplexer circuits 541-544 is configurable to provide one or more clock signals from vertical clock buses 521-524, respectively, to a row of the destination circuits 571 through a respective horizontal clock bus.

For example, clock signals SCK1 are provided through clock bus 521 to the multiplexing inputs of multiplexer circuits 541A-541B and additional multiplexer circuits 541. The additional multiplexer circuits 541 are not shown in FIG. 5 to simplify the drawing. Multiplexer circuits 541A-541B are configurable to generate row clock signals RCK1 and RCK2, respectively, based on selected ones of clock signals SCK1. Clock signals RCK1 and RCK2 are provided from multiplexer circuits 541A-541B, respectively, to rows of destination circuits 571 through horizontal clock buses.

Clock signals SCK2 are provided through clock bus 522 to the multiplexing inputs of multiplexer circuits 542A-542B and additional multiplexer circuits 542. The additional multiplexer circuits 542 are not shown in FIG. 5 to simplify the drawing. Multiplexer circuits 542A-542B are configurable to generate row clock signals RCK3 and RCK4, respectively, based on selected ones of clock signals SCK2. Clock signals RCK3 and RCK4 are provided from multiplexer circuits 542A-542B, respectively, to rows of destination circuits 571 through horizontal clock buses.

Clock signals SCK3 are provided through clock bus 523 to the multiplexing inputs of multiplexer circuits 543A-543B and additional multiplexer circuits 543. The additional multiplexer circuits 543 are not shown in FIG. 5 to simplify the drawing. Multiplexer circuits 543A-543B are configurable to generate row clock signals RCK5 and RCK6, respectively, based on selected ones of clock signals SCK3. Clock signals RCK5 and RCK6 are provided from multiplexer circuits 543A-543B, respectively, to rows of destination circuits 571 through horizontal clock buses.

Clock signals SCK4 are provided through clock bus 524 to the multiplexing inputs of multiplexer circuits 544A-544B and additional multiplexer circuits 544. The additional multiplexer circuits 544 are not shown in FIG. 5 to simplify the drawing. Multiplexer circuits 544A-544B are configurable to generate row clock signals RCK7 and RCK8, respectively, based on selected ones of clock signals SCK4. Clock signals RCK7 and RCK8 are provided from multiplexer circuits 544A-544B, respectively, to rows of destination circuits 571 through horizontal clock buses. In exemplary embodiments, each of multiplexer circuits 541-544 outputs hundreds or thousands of row clock signals that are provided to the destination circuits 571 in the corresponding row.

Each of the interface circuits in integrated circuit 100 may generate regional, local, and/or peripheral clock signals that are provided directly to an adjacent secondary clock spine or to an adjacent tertiary clock spine. The regional clock signals can be provided to all of the destination circuits 571 in region 500 via the secondary clock spine and the two adjacent tertiary clock spines. Each of the local clock signals can be provided to the destination circuits in one-half of region 500 via the secondary clock spine and half of each of the two adjacent tertiary clock spines. Each of the peripheral clock signals can be provided to the destination circuits in one-quarter of region 500 via half of a tertiary clock spine.

The clock buses that provide the regional clock signals, the local clock signals, and the peripheral clock signals to multiplexer circuits 531-534 are regional, local, and peripheral clock networks that are not part of the global clock network of integrated circuit 100. The regional, local, and peripheral clock networks are used to provide high speed, low skew transfers of clock signals from the interface circuits to the destination circuits 571.

Region 500 receives a set of regional clock signals RGCK that are generated by a respective one of interface circuits 121-128 shown in FIG. 1. Regional clock signals RGCK are provided directly to region 500 through horizontal clock bus 515. The regional clock signals RGCK are provided through horizontal clock bus 515 to horizontal clock bus 516. In an alternative embodiment, interface circuit 505 generates regional clock signals RGCK.

The regional clock signals RGCK are provided through horizontal clock bus 516 to clock bus 517 in tertiary clock spine 501 and to clock bus 518 in tertiary clock spine 502. The regional clock signals RGCK are provided through clock bus 517 to second multiplexing inputs of each of multiplexer circuits 531 and 532. The regional clock signals RGCK are also provided through clock bus 518 to second multiplexing inputs of each of multiplexer circuits 533 and 534.

In some embodiments, each of the interface circuit blocks shown in FIG. 1 in integrated circuit 100 includes two or more interface circuits. In a particular embodiment, interface circuit 505 shown in FIG. 5 includes two interface circuits. In this embodiment, the first interface circuit in circuit 505 generates first local clock signals LCK1, and the second interface circuit in circuit 505 generates second local clock signals LCK2. The interface circuits in circuit 505 may, for example, generate the first and second local clock signals LCK1 and LCK2 using PLL circuits, DLL circuits, counter circuits, or CDR circuits. The first local clock signals LCK1 are provided through clock bus 550 and clock bus 551 to third multiplexing inputs of each of the multiplexer circuits 531 and 533. The second local clock signals LCK2 are provided through clock bus 560 and clock bus 561 to third multiplexing inputs of each of the multiplexer circuits 532 and 534.

In an embodiment, the first interface circuit in circuit 505 generates first peripheral clock signals PCK1, and the second interface circuit in circuit 505 generates second peripheral clock signals PCK2. The interface circuits in circuit 505 may, for example, generate the first and second peripheral clock signals PCK1 and PCK2 using PLL circuits, DLL circuits, counter circuits, or CDR circuits. The first peripheral clock signals PCK1 are provided through clock bus 552 to fourth multiplexing inputs of multiplexer circuit 533. The second peripheral clock signals PCK2 are provided through clock bus 562 to fourth multiplexing inputs of multiplexer circuit 534.

Multiplexer circuits 531 and 532 are configurable to generate clock signals SCK1 and SCK2, respectively, at their outputs based on any selectable combination of the global clock signals GCK at their first multiplexing inputs, the regional clock signals RGCK at their second multiplexing inputs, and the local clock signals at their third multiplexing inputs.

Multiplexer circuits 533 and 534 are configurable to generate clock signals SCK3 and SCK4, respectively, at their outputs based on any selectable combination of the global clock signals GCK at their first multiplexing inputs, the regional clock signals RGCK at their second multiplexing inputs, the local clock signals at their third multiplexing inputs, and the peripheral clock signals at their fourth multiplexing inputs.

Clock signals SCK1-SCK4 are provided from multiplexer circuits 531-534 through vertical clock buses 521-524 to multiplexing inputs of multiplexer circuits 541-544, respectively, as described above. Multiplexer circuits 541-544 generate output clock signals at their outputs based on clock signals SCK1-SCK4, respectively. The output clock signals of multiplexer circuits 541-544 are provided to the rows of destination circuits 571.

FIG. 5 further illustrates a region 504 that includes multiplexer circuits 581-582 and other multiplexer circuits not shown to simplify the drawing. The multiplexer circuits in region 504 can be configured to provide clock signals from region 500 to interface circuit 505. The output clock signals RCK6 of multiplexer circuit 543B are provided to multiplexing inputs of multiplexer circuit 581. A clock signal HV1 is provided from one of the destination circuits 571 in region 500 to another multiplexing input of multiplexer circuit 581. Multiplexer circuit 581 can be configured to generate clock signals HIOCK1 at its outputs based on any selectable combination of the clock signals RCK6 and HV1 at its multiplexing inputs. Clock signals HIOCK1 are provided to interface circuit 505.

The output clock signals RCK8 of multiplexer circuit 544B are provided to multiplexing inputs of multiplexer circuit 582. A clock signal HV2 is provided from one of the destination circuits 571 in region 500 to another multiplexing input of multiplexer circuit 582. Multiplexer circuit 582 can be configured to generate clock signals HIOCK2 at its outputs based on any selectable combination of the clock signals RCK8 and HV2 at its multiplexing inputs. Clock signals HIOCK2 are provided to interface circuit 505. In an embodiment, clock signals HIOCK1 are provided to the first interface circuit in circuit 505, and clock signals HIOCK2 are provided to the second interface circuit in circuit 505. The other multiplexer circuits in region 504 can be configured to generate clock signals based on selectable combinations of the row clock signals output by other ones of the multiplexer circuits 543-544. The clock signals generated by the other multiplexer circuits in region 504 are provided to interface circuit 505.

Figure 6:
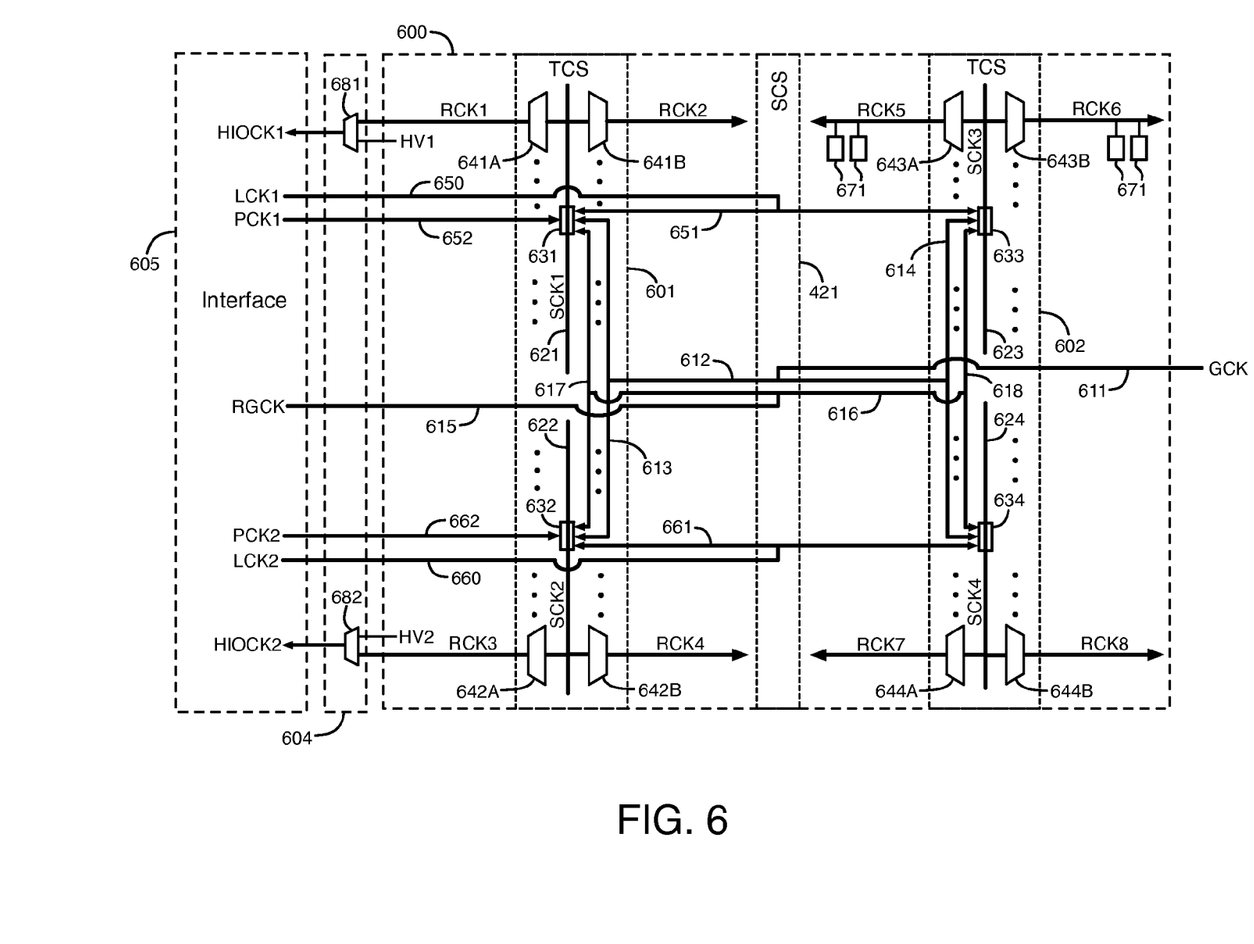
FIG. 6 illustrates another region of the integrated circuit of FIG. 1 that includes two tertiary clock spines and a portion of a secondary clock spine of the global clock network, according to another embodiment of the present invention.

FIG. 6 illustrates a region 600 of integrated circuit 100 that includes two tertiary clock spines (TCS) 601-602 and a portion of secondary clock spine (SCS) 421 of the global clock network, according to an embodiment of the present invention. Region 600 is an example of a region of integrated circuit 100 that includes two horizontally adjacent tertiary clock spines and a portion of a secondary clock spine. FIG. 6 also illustrates an interface circuit 605. Tertiary clock spine 601, tertiary clock spine 602, and interface circuit 605 are examples of tertiary clock spines 431-438, tertiary clock spines 441-448, and interface circuits 101-108, respectively. For example, tertiary clock spines 601 and 602 and interface circuit 605 are examples of tertiary clock spines 431 and 441 and interface circuit 101, respectively.

Horizontal clock bus 611 in FIG. 6 is an example of a respective one of the horizontal clock buses 411-418 shown in FIG. 4. Tertiary clock spine 601 includes multiplexer circuits 631-632 and 641-642 and clock buses 621-622, 613, and 617. Tertiary clock spine 602 includes multiplexer circuits 633-634 and 643-644 and clock buses 614, 618, and 623-624. Clock buses 621-622 in tertiary clock spine 601 are coupled to multiplexer circuits 641-642, respectively. Clock buses 623-624 in tertiary clock spine 602 are coupled to multiplexer circuits 643-644, respectively.

Region 600 includes several rows of destination circuits 671. Only two rows of destination circuits 671 are shown in FIG. 6 to simplify the drawing. Each row of the destination circuits 671 in region 600 is coupled to the output of one of the multiplexer circuits 641-644.

Secondary clock spine 421 includes connections between clock buses 611, 615, 650, 660 and clock buses 612, 616, 651, 661, respectively. The global clock signals GCK are provided through horizontal clock bus 611 to horizontal clock bus 612. Horizontal clock bus 612 is an example of a respective one of the horizontal clock buses 471-478.

The global clock signals GCK are provided through clock buses 611, 612, and 613 to first multiplexing inputs of each of multiplexer circuits 631 and 632. The global clock signals GCK are also provided through clock buses 611, 612, and 614 to first multiplexing inputs of each of multiplexer circuits 633 and 634.

In the embodiment of FIG. 6, interface circuit 605 generates regional clock signals RGCK. Regional clock signals RGCK are provided directly to region 600 through horizontal clock bus 615. The regional clock signals RGCK are provided through horizontal clock bus 615, horizontal clock bus 616, and clock bus 617 in tertiary clock spine 601 to second multiplexing inputs of each of multiplexer circuits 631 and 632. The regional clock signals RGCK are also provided through horizontal clock bus 615, horizontal clock bus 616, and clock bus 618 to second multiplexing inputs of each of multiplexer circuits 633 and 634. In an alternative embodiment, regional clock signals RGCK are generated by an adjacent one of interface circuits 111-118.

Interface circuit 605 generates first and second local clock signals LCK1 and LCK2 using one or more clock signal generation circuits. The first local clock signals LCK1 are provided through clock bus 650 and clock bus 651 to third multiplexing inputs of each of multiplexer circuits 631 and 633. The second local clock signals LCK2 are provided through clock bus 660 and clock bus 661 to third multiplexing inputs of each of the multiplexer circuits 632 and 634.

Interface circuit 605 generates first and second peripheral clock signals PCK1 and PCK2 using one or more clock signal generation circuits. The first peripheral clock signals PCK1 are provided through clock bus 652 to fourth multiplexing inputs of multiplexer circuit 631. The second peripheral clock signals PCK2 are provided through clock bus 662 to fourth multiplexing inputs of multiplexer circuit 632.

Multiplexer circuits 631 and 632 are configurable to generate clock signals SCK1 and SCK2, respectively, at their outputs based on any selectable combination of the global clock signals GCK at their first multiplexing inputs, the regional clock signals RGCK at their second multiplexing inputs, the local clock signals at their third multiplexing inputs, and the peripheral clock signals at their fourth multiplexing inputs.

Multiplexer circuits 633 and 634 are configurable to generate clock signals SCK3 and SCK4, respectively, at their outputs based on any selectable combination of the global clock signals GCK at their first multiplexing inputs, the regional clock signals RGCK at their second multiplexing inputs, and the local clock signals at their third multiplexing inputs.

Clock signals SCK1-SCK4 are provided from multiplexer circuits 631-634 through vertical clock buses 621-624 to multiplexing inputs of multiplexer circuits 641-644, respectively. Multiplexer circuits 641-644 generate output clock signals at their outputs based on clock signals SCK1-SCK4, respectively. The output clock signals of multiplexer circuits 641-644 are provided to the rows of destination circuits 671. For example, the output clock signals RCK1-RCK8 of multiplexer circuits 641A, 641B, 642A, 642B, 643A, 643B, 644A, and 644B, respectively, are provided to corresponding rows of destination circuits 671.

FIG. 6 further illustrates a region 604 that includes multiplexer circuits 681-682 and other multiplexer circuits that are not shown to simplify the drawing. The multiplexer circuits in region 604 can be configured to provide clock signals from region 600 to interface circuit 605. The output clock signals RCK1 of multiplexer circuit 641A are provided to multiplexing inputs of multiplexer circuit 681. A clock signal HV1 is provided from one of the destination circuits 671 in region 600 to another multiplexing input of multiplexer circuit 681. Multiplexer circuit 681 can be configured to generate clock signals HIOCK1 at its outputs based on any selectable combination of the clock signals RCK1 and HV1. Clock signals HIOCK1 are provided to interface circuit 605.

The output clock signals RCK3 of multiplexer circuit 642A are provided to multiplexing inputs of multiplexer circuit 682. A clock signal HV2 is provided from one of the destination circuits 671 in region 600 to another multiplexing input of multiplexer circuit 682. Multiplexer circuit 682 can be configured to generate clock signals HIOCK2 at its outputs based on any selectable combination of the clock signals RCK3 and HV2. Clock signals HIOCK2 are provided to interface circuit 605. The other multiplexer circuits in region 604 can be configured to generate clock signals based on selectable combinations of the row clock signals output by other ones of the multiplexer circuits 641 and 642. The clock signals generated by the other multiplexer circuits in region 604 are provided to interface circuit 605.

Figure 7:
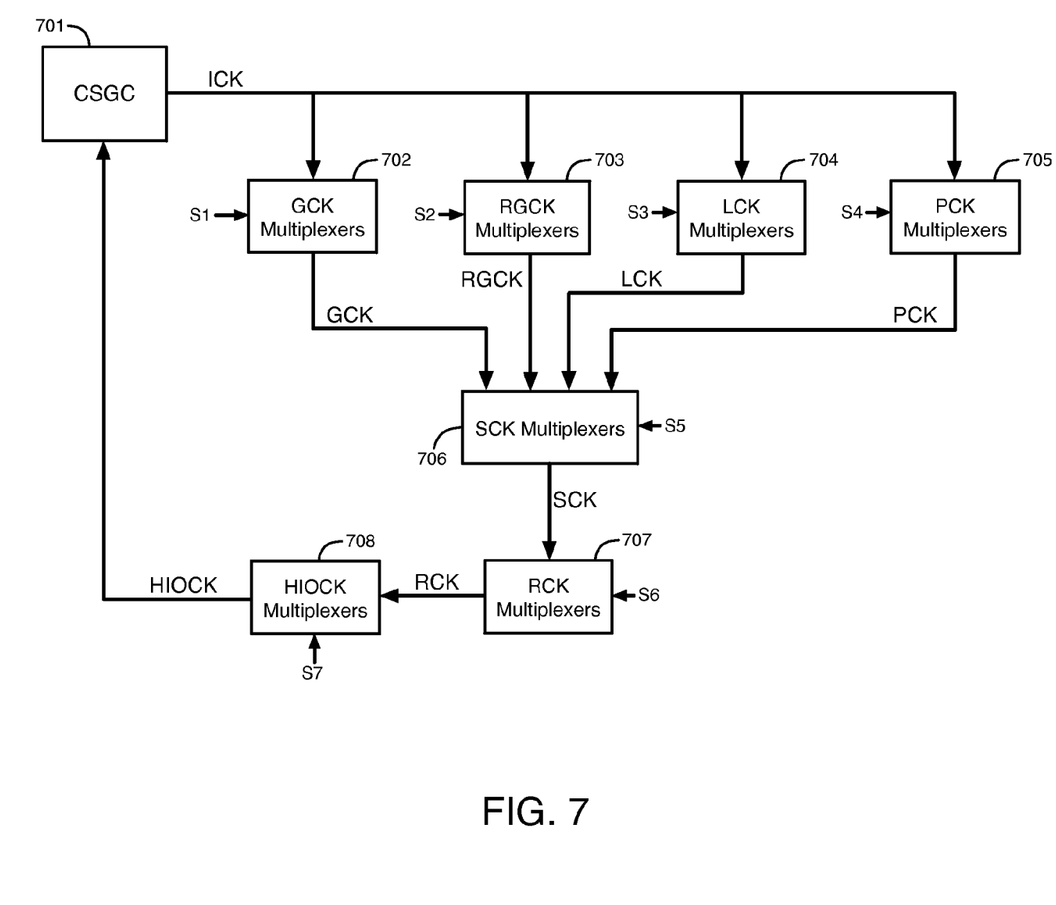
FIG. 7 illustrates an example of the hierarchy of multiplexer circuits in various clock networks in the integrated circuit of FIG. 1, according to an embodiment of the present invention.

FIG. 7 illustrates an example of the hierarchy of multiplexer circuits in various clock networks in integrated circuit 100, according to an embodiment of the present invention. FIG. 7 illustrates a clock signal generation circuit (CSGC) 701. CSGC 701 is located in one of the interface circuits in integrated circuit 100. CSGC 701 may include, for example, a phase-locked loop circuit, a delay-locked loop circuit, a counter circuit, or a clock data recovery circuit. CSGC 701 generates a set of clock signals ICK in response to one or more of clock signals HIOCK. One or more of clock signals HIOCK may function as a feedback clock signal or a reference clock signal for CSGC 701.

FIG. 7 also illustrates 7 sets of multiplexer circuits including GCK multiplexer circuits 702, RGCK multiplexer circuits 703, LCK multiplexer circuits 704, PCK multiplexer circuits 705, SCK multiplexer circuits 706, RCK multiplexer circuits 707, and HIOCK multiplexer circuits 708. Multiplexer circuits 702-708 are configured by select signals S1-S7, respectively. Clock signals ICK are provided to multiplexing inputs of each of the four sets of multiplexer circuits 702-705. Multiplexer circuits 702-705 may be, for example, in or next to the interface circuit that contains CSGC 701.

Multiplexer circuits 702 are configured by select signals S1 to generate global clock signals GCK at their outputs based on all of clock signals ICK or based on a selected subset of clock signals ICK. Multiplexer circuits 261-263 and 271-273 are examples of multiplexer circuits 702. Multiplexer circuits 703 are configured by select signals S2 to generate regional clock signals RGCK at their outputs based on all of clock signals ICK or based on a selected subset of clock signals ICK. Multiplexer circuits 704 are configured by select signals S3 to generate local clock signals LCK at their outputs based on all of clock signals ICK or based on a selected subset of clock signals ICK. Multiplexer circuits 705 are configured by select signals S4 to generate peripheral clock signals PCK at their outputs based on all of clock signals ICK or based on a selected subset of clock signals ICK.

Clock signals GCK, RGCK, LCK, and PCK are provided through the global, regional, local, and peripheral clock networks, respectively, to multiplexing inputs of multiplexer circuits 706 in the tertiary clock spines, as described above. Some of the tertiary clock spines do not receive the peripheral clock signals PCK, as described above with respect to FIGS. 5-6. Multiplexer circuits 533-534 and 631-632 are examples of multiplexer circuits 706. Multiplexer circuits 706 are configured by select signals S5 to generate clock signals SCK at their outputs based on any selectable combination of the global clock signals GCK, the regional clock signals RGCK, the local clock signals LCK, and the peripheral clock signals PCK.

Clock signals SCK are provided to multiplexing inputs of multiplexer circuits 707. Multiplexer circuits 707 are configured by select signals S6 to generate row clock signals RCK based on any selectable combination of clock signals SCK. Multiplexer circuits 543-544 and 641-642 are examples of multiplexer circuits 707. The row clock signals RCK are provided to multiplexing inputs of multiplexer circuits 708. Multiplexer circuits 708 are configured by select signals S7 to generate clock signals HIOCK based on any selectable combination of the row clock signals RCK. Clock signals HIOCK are provided to inputs of CSGC 701. Multiplexer circuits 581-582 and 681-682 are examples of multiplexer circuits 708.

Figure 8:
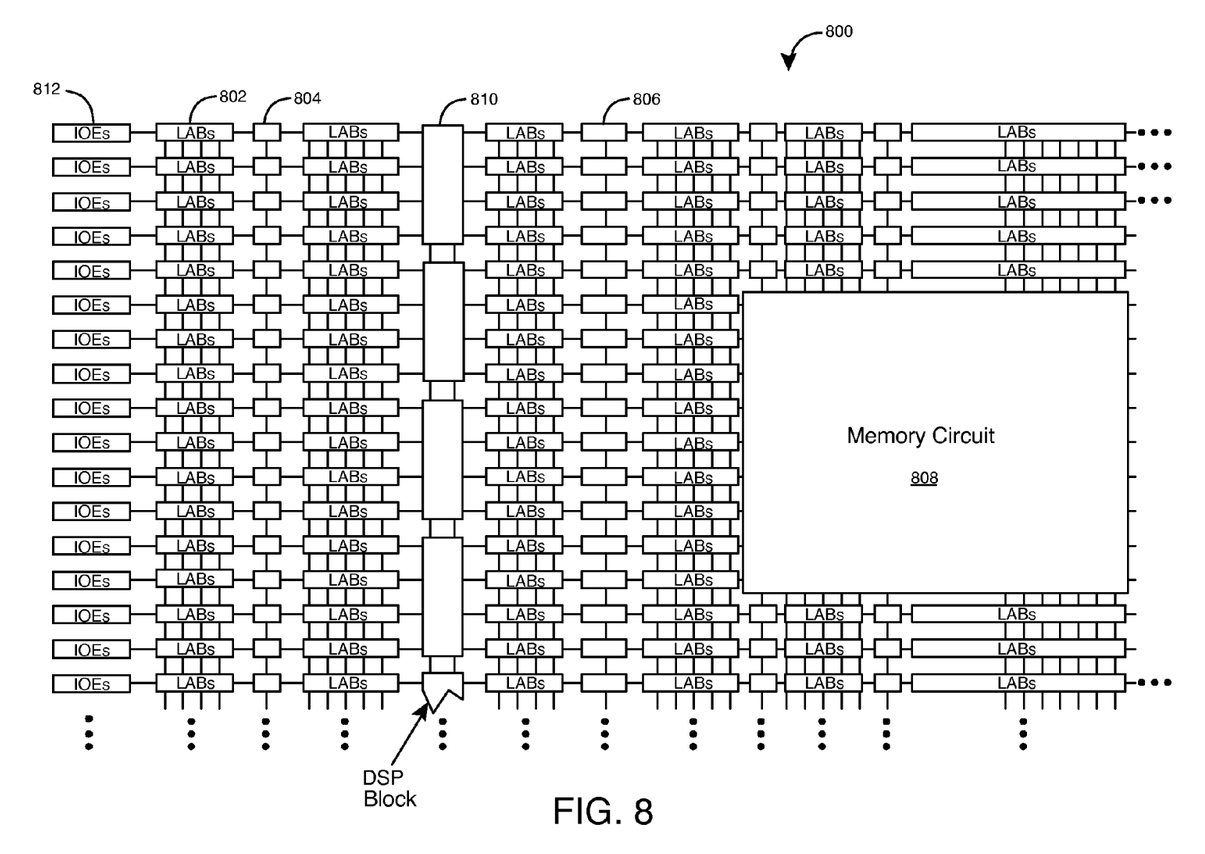
FIG. 8 is a simplified partial block diagram of a field programmable gate array (FPGA) that can include embodiments of the present invention.

FIG. 8 is a simplified partial block diagram of a field programmable gate array (FPGA) 800 that can include embodiments of the present invention. FPGA 800 is merely one example of an integrated circuit that can include features of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), application specific integrated circuits (ASICs), memory integrated circuits, central processing units, microprocessors, analog integrated circuits, etc.

FPGA 800 includes a two-dimensional array of programmable logic array blocks (or LABs) 802 that are interconnected by a network of column and row interconnect conductors of varying length and speed. Each LAB 802 includes multiple (e.g., 10) logic elements (or LEs).

A logic element (LE) is a programmable logic circuit block that provides for efficient implementation of user defined logic functions. An FPGA has numerous logic elements that can be configured to implement various combinatorial and sequential functions. The logic elements have access to a programmable interconnect structure. The programmable interconnect structure can be programmed to provide data signals between the logic elements.

FPGA 800 also includes a distributed memory structure including random access memory (RAM) circuits of varying sizes provided throughout the array. The RAM circuits include, for example, circuits 804, circuits 806, and circuit 808. These memory circuits can also include shift registers and first-in-first-out (FIFO) buffers.

FPGA 800 further includes digital signal processing (DSP) circuits 810 that can implement, for example, multipliers with add or subtract features. Input/output elements (IOEs) 812 support numerous single-ended and differential input/output standards. IOEs 812 include input and output buffers that are coupled to pads of the integrated circuit 800. The pads are external terminals of the FPGA die. The pads are used to route, for example, input signals, output signals, clock signals, and supply voltages between FPGA 800 and one or more external devices or other circuits in FPGA 800. IOEs 812 may be located in the interface circuits described above. FPGA 800 is an example of integrated circuit 100. FPGA 800 is described herein for illustrative purposes. Embodiments of the present invention can be implemented in many different types of integrated circuits.

Figure 9:
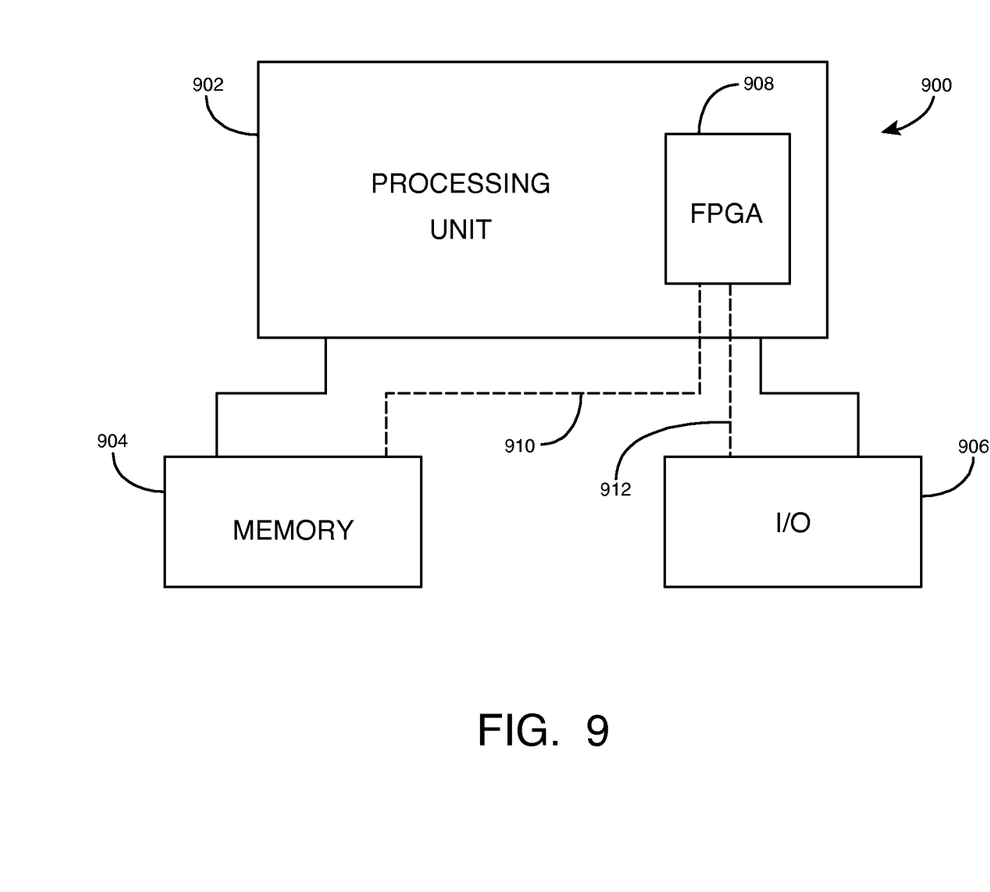
FIG. 9 shows a block diagram of an exemplary digital system that can embody techniques of the present invention.

Embodiments of the present invention can also be implemented in a system that has an FPGA as one of several components. FIG. 9 shows a block diagram of an exemplary digital system 900 that can embody techniques of the present invention. System 900 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 900 can be provided on a single board, on multiple boards, or within multiple enclosures.

System 900 includes a processing unit 902, a memory unit 904, and an input/output (I/O) unit 906 interconnected together by one or more buses. According to this exemplary embodiment, an FPGA 908 is embedded in processing unit 902. FPGA 908 can serve many different purposes within the system of FIG. 9. FPGA 908 can, for example, be a logical building block of processing unit 902, supporting its internal and external operations. FPGA 908 is programmed to implement the logical functions necessary to carry on its particular role in system operation. FPGA 908 can be specially coupled to memory 904 through connection 910 and to I/O unit 906 through connection 912.

Processing unit 902 can direct data to an appropriate system component for processing or storage, execute a program stored in memory 904, receive and transmit data via I/O unit 906, or perform other functions. Processing unit 902 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 908 can control the logical operations of the system. As another example, FPGA 908 acts as a reconfigurable processor that can be reprogrammed as needed to handle a particular computing task. Alternatively, FPGA 908 can itself include an embedded microprocessor. Memory unit 904 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. An integrated circuit comprising:
    a first vertical clock bus;
    a first interface circuit coupled to provide first global clock signals to the first vertical clock bus, wherein the first interface circuit is coupled to a first external terminal of the integrated circuit;
    a second vertical clock bus;
    a second interface circuit coupled to provide second global clock signals to the second vertical clock bus, wherein the second interface circuit is coupled to a second external terminal of the integrated circuit; and
    a first horizontal clock bus coupled to provide the first and the second global clock signals from the first and the second vertical clock buses to a center region of the integrated circuit.

2. The integrated circuit of claim 1 further comprising:
    a global clock spine comprising a first clock bus, wherein the global clock spine is coupled to provide the first and the second global clock signals from the first horizontal clock bus to a top half of the integrated circuit and to a bottom half of the integrated circuit.

3. The integrated circuit of claim 2 further comprising:
a second horizontal clock bus coupled to the global clock spine, wherein the second horizontal clock bus is coupled to provide the first and the second global clock signals from the global clock spine to a right half of the integrated circuit and to a left half of the integrated circuit in the top half of the integrated circuit; and
a third horizontal clock bus coupled to the global clock spine, wherein the third horizontal clock bus is coupled to provide the first and the second global clock signals from the global clock spine to the right half of the integrated circuit and to the left half of the integrated circuit in the bottom half of the integrated circuit.

4. The integrated circuit of claim 3 further comprising:
a second clock bus coupled to the second horizontal clock bus;
second and third clock spines that are each coupled to the second clock bus;
a third clock bus coupled to the third horizontal clock bus; and
fourth and fifth clock spines that are each coupled to the third clock bus.

5. The integrated circuit of claim 4, wherein each of the second, the third, the fourth, and the fifth clock spines comprises conductors and a set of multiplexer circuits coupled to provide clock signals to destination circuits that are generated based on selected ones of the first and the second global clock signals.

6. The integrated circuit of claim 4 further comprising:
a regional clock bus coupled to provide third clock signals from one of the first, the second, or a third interface circuit to the second and the third clock spines, and wherein each of the second and the third clock spines comprises multiplexer circuits coupled to provide fourth clock signals to destination circuits that are generated based on selected ones of the first and the second global clock signals and the third clock signals.

7. The integrated circuit of claim 6 further comprising:
a local clock bus coupled to provide fifth clock signals from one of the first, the second, the third, or a fourth interface circuit to the second and the third clock spines, wherein a subset of the multiplexer circuits in half of the second clock spine and a subset of the multiplexer circuits in half of the third clock spine generate respective ones of the fourth clock signals based on selected ones of the first global clock signals, the second global clock signals, the third clock signals, and the fifth clock signals.

8. The integrated circuit of claim 1 further comprising:
a third vertical clock bus, wherein lengths of the first, the second, and the third vertical clock buses are more than half a width of the integrated circuit;
a second horizontal clock bus coupled to the third vertical clock bus; and
a third interface circuit to provide third global clock signals to the third vertical clock bus, wherein the second horizontal clock bus provides the third global clock signals from the third vertical clock bus to the center region of the integrated circuit, and wherein the third interface circuit is coupled to a third external terminal of the integrated circuit.

9. The integrated circuit of claim 8, wherein the first interface circuit is in a first column of interface circuits that are coupled to provide global clock signals to the first vertical clock bus, wherein the second interface circuit is in a second column of interface circuits that are coupled to provide global clock signals to the second vertical clock bus, and wherein the third interface circuit is in a third column of interface circuits that are coupled to provide global clock signals to the third vertical clock bus.

10. An integrated circuit comprising a global clock network, the global clock network comprising:
a first clock spine comprising first, second, third, and fourth clock buses, wherein the first clock bus is coupled to the second clock bus, and wherein the second clock bus is coupled to each of the third and the fourth clock buses;
a fifth clock bus coupled to the third clock bus, wherein the fifth clock bus is in a top half of the integrated circuit, and wherein the fifth clock bus extends to left and right halves of the integrated circuit; and
a sixth clock bus coupled to the fourth clock bus, wherein the sixth clock bus is in the top half of the integrated circuit, and wherein the sixth clock bus extends to the left and the right halves of the integrated circuit.

11. The integrated circuit of claim 10, wherein the first clock spine further comprises seventh, eighth, and ninth clock buses, wherein the first clock bus is coupled to the seventh clock bus, wherein the seventh clock bus is coupled to each of the eighth and the ninth clock buses, and wherein the integrated circuit further comprises:
a tenth clock bus coupled to the eighth clock bus, wherein the tenth clock bus is in a bottom half of the integrated circuit, and wherein the tenth clock bus extends to the left and the right halves of the integrated circuit; and
an eleventh clock bus coupled to the ninth clock bus, wherein the eleventh clock bus is in the bottom half of the integrated circuit, and wherein the eleventh clock bus extends to the left and the right halves of the integrated circuit.

12. The integrated circuit of claim 10 further comprising:
a seventh clock bus coupled to the fifth clock bus, wherein the seventh clock bus is in the left half of the integrated circuit;
second and third clock spines coupled to the seventh clock bus, wherein each of the second and the third clock spines comprises multiplexer circuits that are coupled to receive clock signals via the seventh clock bus;
an eighth clock bus coupled to the fifth clock bus, wherein the eighth clock bus is in the right half of the integrated circuit; and
fourth and fifth clock spines coupled to the eighth clock bus, wherein each of the fourth and the fifth clock spines comprises multiplexer circuits that are coupled to receive clock signals via the eighth clock bus.

13. The integrated circuit of claim 12 further comprising:
a ninth clock bus coupled to the sixth clock bus, wherein the ninth clock bus is in the left half of the integrated circuit;
sixth and seventh clock spines coupled to the ninth clock bus, wherein each of the sixth and the seventh clock spines comprises multiplexer circuits that are coupled to receive clock signals via the ninth clock bus;
a tenth clock bus coupled to the sixth clock bus, wherein the tenth clock bus is in the right half of the integrated circuit; and
eighth and ninth clock spines coupled to the tenth clock bus, wherein each of the eighth and the ninth clock spines comprises multiplexer circuits that are coupled to receive clock signals via the tenth clock bus.

14. The integrated circuit of claim 13 further comprising:
an eleventh clock bus coupled to the third clock bus, wherein the eleventh clock bus is in the top half of the integrated circuit;

a twelfth clock bus coupled to the eleventh clock bus, wherein the twelfth clock bus is in the left half of the integrated circuit;

tenth and eleventh clock spines coupled to the twelfth clock bus, wherein each of the tenth and the eleventh clock spines comprises multiplexer circuits that are coupled to receive clock signals via the twelfth clock bus;

a thirteenth clock bus coupled to the eleventh clock bus, wherein the thirteenth clock bus is in the right half of the integrated circuit; and twelfth and thirteenth clock spines coupled to the thirteenth clock bus, wherein each of the twelfth and the thirteenth clock spines comprises multiplexer circuits that are coupled to receive clock signals via the thirteenth clock bus.

15. The integrated circuit of claim 10 further comprising:

a seventh clock bus coupled to the first clock bus in a center region of the integrated circuit;

an eighth clock bus coupled to the seventh clock bus, wherein the seventh and the eighth clock buses are perpendicular; and interface circuits coupled to the eighth clock bus, wherein each of the interface circuits is coupled to an external terminal of the integrated circuit, and wherein a length of the eighth clock bus is more than half a width of the integrated circuit.

16. A method comprising:

providing first clock signals from a first interface circuit to a first vertical clock bus in an integrated circuit, wherein the first interface circuit is coupled to a first external terminal of the integrated circuit;

providing second clock signals from a second interface circuit to a second vertical clock bus in the integrated circuit, wherein the second interface circuit is coupled to a second external terminal of the integrated circuit; and providing the first and the second clock signals from the first and the second vertical clock buses to a center region of the integrated circuit through a first horizontal clock bus in the integrated circuit, wherein the first vertical clock bus, the second vertical clock bus, and the first horizontal clock bus are part of a global clock network.

17. The method of claim 16 further comprising:

providing the first and the second clock signals from the first horizontal clock bus to a top half of the integrated circuit and to a bottom half of the integrated circuit through a global clock spine comprising a first clock bus in the integrated circuit.

18. The method of claim 17 further comprising:

providing the first and the second clock signals from the global clock spine to a right half of the integrated circuit and to a left half of the integrated circuit in the top half of the integrated circuit through a second clock bus coupled to the global clock spine; and providing the first and the second clock signals from the global clock spine to the right half of the integrated circuit and to the left half of the integrated circuit in the bottom half of the integrated circuit through a third clock bus coupled to the global clock spine.

19. The method of claim 16 further comprising:

providing third clock signals from a third interface circuit to a third vertical clock bus in the integrated circuit, wherein the third vertical clock bus is parallel to the first and the second vertical clock buses, and wherein lengths of the first, the second, and the third vertical clock buses are more than half a width of the integrated circuit; and providing the third clock signals from the third vertical clock bus to the center region of the integrated circuit through a second horizontal clock bus, wherein the second horizontal clock bus is coupled to the third vertical clock bus, and wherein the third interface circuit is coupled to a third external terminal of the integrated circuit.

20. The method of claim 19 further comprising:

providing fourth clock signals from a fourth interface circuit to a fourth vertical clock bus in the integrated circuit, wherein the fourth vertical clock bus is parallel to the first and the second vertical clock buses, and wherein a length of the fourth vertical clock bus is more than half the width of the integrated circuit; and providing the fourth clock signals from the fourth vertical clock bus to the center region of the integrated circuit through the second horizontal clock bus, wherein the second horizontal clock bus is coupled to the fourth vertical clock bus, and wherein the fourth interface circuit is coupled to a fourth external terminal of the integrated circuit.

* * * * *